United States Patent Office 3,363,028
Patented Jan. 9, 1968

3,363,028
POLYVINYL CHLORIDE COMPOSITIONS
FOR BLOW MOLDING
Paul Joseph Szalay, Toledo, Ohio, assignor to Owens-Illinois, Inc., a corporation of Ohio
No Drawing. Filed Mar. 1, 1965, Ser. No. 436,326
1 Claim. (Cl. 260—862)

This invention is concerned with polyvinyl type polymeric compositions, solid and liquid polymerization processes for the preparation of said polymeric compositions and articles manufactured from this polymeric composition.

Polyvinyl halide and modified polyvinyl halide compositions are commonly known. However, as a raw material for the manufacture of articles particularly by blow molding techniques these compositions have several disadvantages. The principal disadvantage of these prior art compositions is their poor clarity. They also are expensive, and require the use of an external lubricating system in forming operations. In contrast the compositions of the subject invention have excellent clarity, are economical and do not require an external lubricant in forming. Likewise, the compositions and articles of this invention have superior dynamic heat stability, reduced oxygen permeation and better solvent resistance.

Objects of the subject invention include the preparation of new polymeric compositions. Another object of this invention includes novel solid and liquid phase polymerization processes for the preparation of these polymeric compositions. A further object includes articles of manufacture which are formed from said polymeric compositions.

The compositions of the subject invention generally comprises a condensation product of a polyvinyl compound with a mixture containing a polyester and a vinyl monomer. The compositions of the subject invention can contain from about 60 to about 99.8 percent of a polyvinyl compound such as polyvinyl chloride. A preferred percentage of the polyvinyl component constituent is between 90 and 98 percent with a most preferred concentration of the polyvinyl constituent being 98 percent. Polyvinyl compounds which are adapted for use in the compositions of this invention include compounds such as polyvinyl fluoride, polyvinyl chloride, polyvinyl bromide, polyvinyl iodide, etc. Polyvinyl chloride is preferred. Copolymers of polyvinyl halides with other polymeric compositions are also readily adapted for use in this invention for example, copolymers of polyvinyl halides with polyvinyl acetate, polyethylene, polystyrene, polypropylene, polyfumarates, polymaleates and polyvinylidene halides such as polyvinylidene fluoride, polyvinylidene chloride, polyvinylidene bromide and polyvinylidene iodide can be used in the subject composition. The preferred embodiment of this invention utilizes homopolymers to the above mentioned copolymers. Polyvinyl compounds of varying molecular weights are adapted for use in this invention.

The above described polyvinyl compounds are condensed with from about 0.2 to about 40 percent of a mixture containing a polyester and a reactive vinyl monomer. A preferred range of concentration for this mixture is from about 2 to 10 percent with a preferred concentration being 2 percent.

The mixture containing the polyester and the reactive vinyl monomer contains from about 50 to about 90 percent of a polyester which is represented by the formula $$HO-R-(O-C-R_1-C-O-R-O-C-R_{2m}-C-O-R)_n-O-C-C=C-C-OH$$

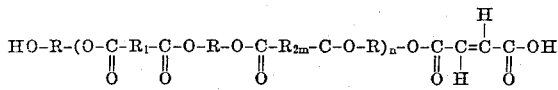

wherein
R is a saturated aliphatic divalent radical having from 2 to 6 carbon atoms
$R_1$ is an unsaturated aliphatic divalent radical having from 2 to 10 carbon atoms
$R_2$ is a saturated aliphatic or aromatic divalent radical having from 2 to 10 carbon atoms
$m$ is a positive integer from 1 to 5
$n$ is a positive integer from 1 to 4

A preferred concentration of the polyester is between 70 and 85 percent of the polyester-reactive vinyl monomer mixture with a preferred concentration being 70 percent.

Polyesters of the type adapted for use in the subject invention can be prepared by the condensation of a glycol such as diethylene glycol, dipropylene glycol, 1,4-butanediol and 1,3-butane-diol with an unsaturated organic carboxylic acid and a plasticizing organic dicarboxylic acid, or with anhydrides of these acids.

Examples of unsaturated organic acids that can be used to prepare the polyester are fumaric acid, maleic acid substituted and unsubstituted ortho, meta and para phthalic acids, and phthalic anhydride.

Plasticizing organic acids which can be used include, for example, adipic acid, glutaric acid, azelaic acid, succinic acid, acetic anhydride, propionic anhydride, butaric anhydride, and succinic anhydride.

The preparation of the polyester component is carried out at a temperature of from about 100 to about 275 degrees centigrade, with a preferred temperature range being from about 180 to about 215 degrees centigrade. This preparatory technique is commonly known, reference to it being made in "Composition and Utilization of Polyesters" (1954) published by National Aniline Division, Allied Chemical and Dye Corporation; Ind. Eng. Chem. 51, 253 (1959) and U.S. Patent 2,195,362 (Mar. 26, 1940).

The preferred polyester for use in this invention is the fumaric acid ester of propylene glycol, sold by the Rhom and Haas Company of Philadelphia, Pa., under the trade name Paraplex P-43.

Paraplex P-43 contains 70% unsaturated polyester and 30% styrene monomer. The chemical and physical properties are as follows:

Limiting values

Specific gravity at 25° C. _____ 11.4–1.15
Viscosity, centipoises at 25° C. _____ 2000–4500
Acid number _____ 30–40
Barcol hardness _____ 45–55
Specific gravity at 25° C. (cured) _____ 1.23–1.24

The polyester-vinyl monomer mixture contains between 10 and 50 percent of a vinyl monomer represented by the formula

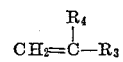

wherein
$R_3$ is a radical such as substituted and unsubstituted mono, di and tri olefins, substituted and unsubstituted phenyl groups, esters, anhydrides, amines, sulfides, aldehydes, ketones, alcohols and carboxylic acids
$R_4$ is a member such as hydrogen, halogen, lower alkyl and alkenyl having from 1 to 6 carbon atoms.

A preferred percentage of this vinyl monomer is from about 15 to about 30 percent with a most preferred percentage being 30 percent.

Reactive vinyl monomers which are particularly adopted to the subject invention include for example, styrene, methyl acrylate, methyl methacrylate, ethyl esters of acrylic acid, vinyl toluene, diallyl phthalate and triallyl cyanurate. Styrene and acrylate esters are preferred.

The desired percentage of this polyester-vinyl monomer mixture is then added to the desired percentage of the polyvinyl compound to form a reaction mixture which is then polymerized by either a solid phase polymerization technique or a liquid phase polymerization technique.

In the solid phase polymerization technique the mixture is heated to temperatures between the range of from about 40 to about 130 degrees centigrade with a most preferred temperature range being from about 100 to about 120 degrees centigrade and a most preferred polymerization temperature being about 120 degrees centigrade.

The polymerization is carried out in the presence of an atmosphere such as oxygen, nitrogen, air, etc. with air being the preferred atmosphere.

The polymerization is carried out at a pressure between the range of atmospheric to about 10 pounds per square inch gauge with a preferred pressure being atmospheric pressure.

The reaction sequence is generally carried out in the presence of from about 0 to about 5 percent of a catalyst. Organo metallic type catalysts are generally preferred with organo tin catalysts being most preferred. Catalysts such as dibutyl stannic mercaptan, dibutyl stannic laurate, dioctyl stannic mercaptan, dioctyl stannic laurate, stannic chloride, stannous chloride, stannous sulfate and stannous hydroxide are adopted for use in this phase of the invention.

The reaction time for the solid phase polymerization can vary from about five minutes to about 24 hours. A preferred range of reaction times is from about ½ hour to about 4 hours with a preferred reaction time being one hour.

The solid phase polymerization process can be carried out in either a dry or swollen state. That is, the polymerization process can utilize dry granular polyvinyl halides and a dry mixture of polyester and vinyl monomer or the polymerization process can utilize granular material which has been contacted with an excess of a solvent such as benzene, toluene, xylene, cyclohexane, hexane and heptane, thereby causing the dry granular material to swell or partially dissolve.

In the solid phase polymerization process the organo metallic catalytic residue is left in the polymeric product upon completion of the polymerization. Said residue is not detrimental to the physical properties of the resulting product and in fact it exhibits anti-oxidant properties.

The polymerization of the polyvinyl halide with the polyester-vinyl monomer mixture can also be carried out in a liquid phase at a temperature between from about 40 to about 60 degrees centigrade. A preferred range of temperatures for the liquid phase polymerization process is between 45 and 50 degrees centigrade with a most preferred polymerization temperature being 50 degrees. The liquid phase polymerization process is carried out in the presence of an atmosphere such as nitrogen, oxygen or air with nitrogen being a preferred atmosphere for the liquid phase polymerization process.

Solvents adapted for use in the liquid phase polymerization process of the subject invention include solvents such as aliphatic and cycloaliphatic hydrocarbons, alcohols, aldehydes, ketones and substituted and unsubstituted aromatic hydrocarbons. Solvents which are particularly suited to this process include benzene, nitro benzene, N,N-dimethyl formamide and methylethyl ketone. The solvent is present on about a 50–50 basis with the reactants.

The liquid phase polymerization process can be carried out over a wide range of pressures. Pressures from about atmospheric to about 200 pounds per square inch gauge are adapted to the subject process with the preferred range of pressures being from about atmospheric to about 20 pounds per square inch gauge and the preferred pressure being atmospheric pressure.

A wide range of catalysts are adapted for use in this liquid phase polymerization technique. The concentration of catalysts ranges from 0 to about 5 percent of the reaction mixture with a preferred concentration being 2 percent. Catalysts of the free radical type are particularly adapted for use in this phase of the subject invention. Catalysts such as hydrogen peroxide, tert-butyl peroxide, lauryl peroxide, methylethyl ketone peroxide, azodiisobutyronitrile, and benzoyl peroxide are representative of a large number of peroxide catalysts which can be used in this liquid phase polymerization process.

The reaction time for the liquid phase polymerization sequence can range in time from about one hour to about 24 hours, with a preferred range of reaction time being from about 18 hours to about 24 hours and the most preferred reaction time being 24 hours.

Articles of manufacture which can be made from the composition of the subject invention include for example, sheets, films and containers of a wide variety such as bottles, jugs, jars, flasks, etc. These articles of manufacture can be formed by conventional techniques such as extrusion, compression molding, injection molding, calendering, etc. Blow molding techniques for example, wherein parison is formed, said parison being finally shaped in a blow molding machine into the form of a container at a temperature which is above the melting point of the polymeric composition are particularly adapted to utilize the compositions of the subject invention.

It is to be noted that the composition of this invention can be used in a pure form or components can be added to improve the fabricating qualities of the compositions.

The following examples will illustrate the composition, processes and resulting products which are part of the subject invention. These examples are given for purposes of illustration and not for purposes of restricting the scope of this invention.

EXAMPLE I

A reactor provided with high speed mixer is charged with 50 kg. of homopolymer of vinyl chloride of medium molecular weight, and with 1 kg. of di-octyl-tin mercaptide. The solid phase, after thorough mixing is reacted with a mixture consisting of 700 g. of the propylene glycol ester of fumaric acid and 300 g. of styrene monomer. The stirrer is then set in motion at a speed of about 1500 r.p.m. and the reaction mixture heated to a temperature of 100–130° C. in the presence of air. After a short induction period the polymerization reaction commences and then proceeds. The polymerization is carried out at atmospheric pressure. A copolymerizate is obtained, in about one hour, with medium to fine particle size which can be readily used for blow molding, extrusion etc. A 98% yield is achieved.

When this copolymer is processed on a blow molding machine at a temperature of 220° F. to 400° F. without external lubrication and stabilization, a container of high clarity is obtained. The thermoplastic container has a flexural stiffness of about 350,000 p.s.i. at 73° F. and 250,000 p.s.i. at 140° F.; and a tensile impact value of 30 to 60 ft.-lbs./in.$^2$ at 73° F. Oxygen permeation is 0.7 cc./in.$^2$/year.

EXAMPLE II

A reactor is supplied with 50 kg. of polyvinyl chloride of low-medium molecular weight, 2000 g. of organic ester consisting of a mixture of 1000 g. of the propylene glycol ester of fumaric acid, 700 g. of phthalic-propylene glycolate, and 300 g. of styrene. The reactants are then copolymerized in the manner described in Example I. The polymerization product obtained in 100% yield is substantially identical to the copolymer produced in Example I, but its impact strength is somewhat lower. A blow molded container had a tensile impact value of 18–22 ft.-lbs./in.$^2$, and a flexural stiffness of 341,700 p.s.i. at 73° F. and 231,300 p.s.i. at 140° F.

EXAMPLE III

Into a reactor is placed 50 kg. of low-medium molecular weight polyvinyl chloride and a mixture consisting of 350 g. of the propylene glycol ester of fumaric acid, 500 g. of the propylene glycol ester of phthalic acid and 150 g. of styrene. The polymerization is carried under the conditioning described in example. The mechanical properties of the blow molded articles are excellent. The tensile impact value is 21 p.s.i. and the flexural stiffness is 355,800 p.s.i. at 73° F. and 248,900 p.s.i. at 140° F. The molded articles exhibit outstanding clarity.

EXAMPLE IV

Employing the reaction conditions described in Example I, 50 kg. of polyvinyl chloride of medium molecular weight in copolymerized with 1000 g. of the propylene glycol ester of fumaric caid dissolved in 300 g. of styrene monomer. The polymerization is initiated with 1000 g. of octyl-tin mercaptide containing 0.4 g. of organic dye, such as Perox Blue 2R. The copolymerizate obtained has the same mechanical properties as the product of Example I, which indicates that the organic dye is inert in the polymerization.

EXAMPLE V

The polymerization technique described in Example I is repeated but in place of dioctyl-tin-mercaptide catalyst 500 g. of calcium-zinc salt of stearate is used. The optical clarity of blown container is not quite the equal of that of the container obtained in accordance with the process of Example I. However the mechanical properties are similar to those of the previous articles.

EXAMPLE VI

The procedure of Example II is used to polymerize high molecule weight polyvinyl chloride with the polyester of propylene glycol fumarate-propylene glycol phthalate dissolved in styrene. The impact strength of this polymer is better than that of the polymer obtained in accordance with the process of Example II. The tensile impact strength is 37.3 ft.-lbs./in.$^2$.

What is claimed is:

1. A plasticized polyvinyl chloride composition consisting essentially of about 98 percent polyvinyl chloride polymer which is polymerized with about 2 percent of a mixture of about 70 perecnt fumaric glycolate polyester and 30 percent styrene.

References Cited

UNITED STATES PATENTS

| | | | |
|---|---|---|---|
| 2,539,207 | 1/1951 | Safford | 260—862 |
| 3,009,196 | 11/1961 | Hagen | 264—99 |
| 3,149,087 | 9/1964 | Anagnostopoulas et al. | 260—31.6 |
| 3,157,713 | 11/1964 | Leese | 260—884 |
| 3,214,490 | 10/1965 | Leebrick et al. | 260—873 |

FOREIGN PATENTS

| | | |
|---|---|---|
| 232,412 | 10/1959 | Australia. |
| 833,610 | 4/1960 | Great Britain. |

GEORGE F. LESMES, *Primary Examiner.*

SAMUEL BLECH, MURRAY TILLMAN, *Examiners.*

J. T. GOOLKASIAN, *Assistant Examiner.*